(12) United States Patent
Lin et al.

(10) Patent No.: US 7,875,307 B2
(45) Date of Patent: Jan. 25, 2011

(54) METHOD FOR FORMING AN ELECTRONIC PAPER DISPLAY

(75) Inventors: Pinyen Lin, Rochester, NY (US); David H. Pan, Rochester, NY (US); Naveen Chopra, Oakville, CA (US); Peter M. Kazmaier, Mississauga, CA (US)

(73) Assignee: Xerox Corporation, Norwalk, CT (US)

( * ) Notice: Subject to any disclaimer, the term of this patent is extended or adjusted under 35 U.S.C. 154(b) by 914 days.

(21) Appl. No.: 11/753,972

(22) Filed: May 25, 2007

(65) Prior Publication Data

US 2008/0292978 A1    Nov. 27, 2008

(51) Int. Cl.
  B05D 5/12    (2006.01)
  B05D 1/36    (2006.01)
  B05D 1/04    (2006.01)

(52) U.S. Cl. .................... 427/58; 427/203; 427/458; 427/466

(58) Field of Classification Search .................. 427/58, 427/203, 458, 466
See application file for complete search history.

(56) References Cited

U.S. PATENT DOCUMENTS

| | | |
|---|---|---|
| 3,526,533 A | 9/1970 | Jacknow et al. |
| 3,590,000 A | 6/1971 | Palermiti et al. |
| 3,668,106 A | 6/1972 | Ota |
| 3,800,588 A | 4/1974 | Larson et al. |
| 3,847,604 A | 11/1974 | Hagenbach et al. |
| 4,338,390 A | 7/1982 | Lu |
| 4,935,326 A | 6/1990 | Creatura et al. |
| 4,937,166 A | 6/1990 | Creatura et al. |
| 6,276,792 B1 | 8/2001 | Gundlach et al. |
| 6,424,364 B2 | 7/2002 | Gundlach et al. |

(Continued)

FOREIGN PATENT DOCUMENTS

JP    2000-035769    2/2000

(Continued)

OTHER PUBLICATIONS

U.S. Appl. No. 11/468,652, filed Aug. 30, 2006 in the name of Naveen Chopra.

(Continued)

Primary Examiner—Timothy H Meeks
Assistant Examiner—James Lin
(74) Attorney, Agent, or Firm—Oliff & Berridge, PLC

(57) ABSTRACT

Methods form a multi-color electrophoretic display. The methods include providing microcapsules, wherein the microcapsules have an electrostatic charge, and wherein the microcapsules comprise, a shell that is transparent and a display medium within the shell, wherein the display medium is comprised of either (a) at least two sets of differently colored particles in a substantially clear fluid, or (b) at least one set of colored particles in a differently colored fluid. The methods include transferring the microcapsules to a substrate, wherein the electrostatic charge of the microcapsules attracts the microcapsules to the substrate, wherein a display layer of microcapsules is formed on the substrate. The methods include positioning a conductive substrate adjacent to the substrate, wherein the substrate is located between the display layer and the conductive substrate. In use, the conductive substrate applies an electric field to the display layer, and wherein the sets of particles within each microcapsule in the display layer are moveable within the microcapsule by the electric field.

27 Claims, 5 Drawing Sheets

U.S. PATENT DOCUMENTS

| | | |
|---|---|---|
| 6,529,313 B1 | 3/2003 | Lin et al. |
| 6,577,433 B1 | 6/2003 | Lin et al. |
| 6,839,158 B2 | 1/2005 | Albert et al. |
| 6,925,281 B2 | 8/2005 | Weber et al. |
| 7,123,238 B2 | 10/2006 | Lin et al. |
| 2002/0018042 A1* | 2/2002 | Albert et al. ............ 345/107 |
| 2002/0089735 A1* | 7/2002 | Albert et al. ............ 359/296 |
| 2006/0234053 A1 | 10/2006 | Yamamoto et al. |

FOREIGN PATENT DOCUMENTS

JP 2004-271724 9/2004

OTHER PUBLICATIONS

U.S. Appl. No. 11/419,440, filed May 19, 2006 in the name of Naveen Chopra.

* cited by examiner

METHOD FOR FORMING AN ELECTRONIC PAPER DISPLAY

TECHNICAL FIELD

Described are methods for forming an electronic paper display with microcapsules having encapsulated reimageable media. The microcapsules may be applied to or developed on a substrate via single component development, two component development, ballistic marking, liquid xerography, ion-charging development or the like. The microcapsules may be or may not be mixed with optional carrier particles prior to being applied to or developed on the substrate. The microcapsules may be pressed to prevent gaps from forming or from being present between the microcapsules and/or the substrate. The microcapsules may form a display layer of microcapsules on the substrate to produce an electrophoretic display or a display device. In the display device, an electrical field may be applied to the microcapsules via a conducting substrate and/or electrodes to display a set of first colored particles or a set of second colored particles of the encapsulated reimageable media within the microcapsules. In this manner, the encapsulated reimageable media may be used in forming images with the electronic paper display.

REFERENCES

U.S. Pat. No. 7,123,238, incorporated herein by reference in its entirety, illustrates an electrophoretic display device that includes a spacer layer positioned between two conductive film substrates.

U.S. Pat. No. 6,577,433, incorporated herein by reference in its entirety, illustrates an electrophoretic display device comprising a multiplicity of individual reservoirs, each containing an electrophoretic display fluid, located between two conductive film substrates, at least one of which is transparent. The electrophoretic display fluid has at least two sets of particles dispersed in a transparent liquid system and one or more charge directors dissolved or dispersed in the liquid system or physically embedded on the surface of the particles or chemically bonded on the surface of the surface of the particles. The at least two sets of particles exhibit different, contrasting color and different charging properties from each other.

U.S. patent application Ser. No. 11/468,652, incorporated herein by reference in its entirety, illustrates a display region between substrates, at least one of which is transparent. The display region including a multiplicity of pixels, wherein one or more of the pixels comprise three or more subpixels. The three or more subpixels is comprised of individual reservoirs that each contains a display medium comprised of one or more set of colored particles in a dielectric fluid. The display medium includes two different colors therein so that the subpixel is capable of exhibiting each of the two different colors, and wherein each of the three or more subpixels include a display medium having a different combination of two colors from the display mediums of all of the other of the three or more subpixels.

BACKGROUND

An electronic paper display may be formed by connecting a thin layer of transparent plastic small beads, which are randomly dispersed, to a surface of a sheet. The beads have two hemispheres that have two contrasting colors, such as black and white, red and white or the like. The hemispheres are electrically charged to exhibit an electrical dipole. For example, the color red on a first hemisphere may be associated with a negative charge and the color white on a second hemisphere may be associated with a positive charge. The hemispheres of the beads are contained within an oil-filled cavity, and rotate within the oil-filled cavities based on electrical charges that attract or repel the electrically charged hemispheres. Thus, the sheet receiving the beads and/or the oil-filled cavities may be required to be stiff and rigid to prevent puncturing of the cavities or damaging of the cavities or the hemispheres of the beads by, for example crushing, flattening or the like.

A voltage is applied to the surface of the sheet via one or more electrode plates associated with the sheet. The voltage applied by the electrode plates provides an electric field which may attract one of the hemispheres of one or more of the beads based on the charge associated with that hemisphere. As a result, one or more of the beads are rotated by the attractive forces between one of the hemispheres of the beads, the charge associated with the hemispheres of the beads, and the electric field created by the electrode plates. As a result, the hemispheres of the beads may rotate to present one of the hemispheres in a viewing direction on the electronic paper. By rotating one or more beads to present one of the hemispheres for each bead, the hemispheres may form or may display an image on the electronic paper. As a result, the electric field applied to the surface of the sheet by the electrode plates creates the image that is viewable from a viewing direction of the electronic paper.

However, connecting a thin layer of the beads having the oil-filled cavities to the surface of the sheet to form the electronic paper is often time consuming and costly. Additionally, a resolution of the images formed on the surface of the electronic paper by the one or more beads tends to be lower because a pixel count per square inch for the thin layer of beads formed on the surface of the sheet is often minimal as compared to a resolution of a conventional display, such as an LCD. Further, increasing the pixels per square inch by increasing a number of beads per square inch on the surface of the sheet is burdensome because difficulties exist for positioning the oil-filled cavities at specific locations corresponding to specific pixels or subpixels. Moreover, sealing an increased number of oil-filled cavities to the surface of the sheet to increase the pixels per square inch is inconvenient for forming electronic paper via the beads. The rotation of the beads to display different hemispheres often tends to be too slow for some display purposes, such as screens and the like. As a result, forming electronic paper with the beads having oil-filled cavity has an increased probability for manufacturing problems and often elevates production costs for the electronic paper.

A need, therefore, exists for a system and a method for forming electronic paper displays with microcapsules having encapsulated reimageable media in a more efficient and reliable manner. Further, a need exists for a system and a method for forming electronic paper displays by printing or developing microcapsules with or without carrier particles onto a substrate to form a display device. Moreover, a need exists for a system and a method for forming electronic paper displays which may position a substrate having microcapsules printed thereon adjacent to one or more conductive substrates for applying an electric field to the microcapsules.

SUMMARY

Described herein is a method for forming an electronic paper display with microcapsules having encapsulated reimageable media.

Each microcapsule may have encapsulated reimageable media, such as, for example, two differently colored particles suspended in a medium, and may be applied to a substrate in forming the electronic paper display. The microcapsules may be dried to form a dry powder of microcapsules for applying to the substrate. Optional carrier particles may or may not be added to the dry powder for developing the dry powder on the substrate by two component development (with carrier) or single component development (without carrier), respectively. Alternatively, the microcapsules may be included in an aerosol and/or liquid for applying the microcapsules onto the substrate, for example by ballistic aerosol marking. In another alternative, the microcapsules may be suspended in a liquid carrier for developing the microcapsules on the substrate via liquid xerography. In yet another alternative, the microcapsules may be generated in an airborne stream to be ion-charged and developed on the substrate by ion-charging development.

After applying or developing the microcapsules on the substrate, the microcapsules may form a display layer of microcapsules on the substrate. The resolution, that is, the density of the microcapsules applied onto the substrate, may be based on carrier particles and/or a size of the microcapsules. A protective layer may be applied to the microcapsules to provide mechanical protection for the microcapsules. The substrate having the microcapsules may be positioned between conductive substrates for applying an electric field to the encapsulated reimageable media to display one or more images.

According to aspects illustrated herein, there is provided a method for forming a multi-color electrophoretic display. The method includes providing microcapsules, wherein the microcapsules have an electrostatic charge, and wherein the microcapsules comprise a shell that is transparent and a display medium within the shell, wherein the display medium is comprised of either (a) at least two sets of differently colored particles in a substantially clear fluid, or (b) at least one set of colored particles in a differently colored fluid. Further, the method includes transferring the microcapsules to a substrate, wherein the electrostatic charge of the microcapsules attracts the microcapsules to the substrate, wherein a display layer of microcapsules is formed on the substrate. Moreover, the method includes positioning a conductive substrate adjacent to the substrate, wherein the substrate is located between the display layer and the conductive substrate. In use, the conductive substrate applies an electric field to the display layer, and the sets of particles within each microcapsule in the display layer are movable within the microcapsule by the electric field.

In embodiments, provided is a method for forming a multi-color electrophoretic display. The method includes providing microcapsules, wherein the microcapsules comprise a shell that is transparent and a display medium within the shell, wherein the display medium is comprised of either (a) at least two sets of differently colored particles in a substantially clear fluid, or (b) at least one set of colored particles in a differently colored fluid. Further, the method includes transferring the microcapsules to a substrate, wherein the microcapsules on the substrate define a display layer of microcapsules on the substrate. Moreover, the methods include positioning a conductive substrate adjacent to the substrate, wherein the substrate is located between the display layer and the conductive substrate. In use, the conductive substrate applies an electric field to the display layer, and the sets of particles of each microcapsule in the display layer are movable within the microcapsule by the electric field.

In other embodiments, provided is a method for forming a multi-color electrophoretic display. The method includes electrostatically charging microcapsules to form charged particles, wherein each microcapsule comprises a shell that is transparent, wherein a surface of the shell contains a charge control agent or a flow aid agent and a display medium within the shell, wherein the display medium is comprised of either (a) at least two sets of differently colored particles in a substantially clear fluid, or (b) at least one set of colored particles in a differently colored fluid. Further, the method includes transferring the charged particles of microcapsules to a substrate, wherein the microcapsules on the substrate define a display layer of microcapsules on the substrate. Moreover, the method includes positioning a conductive substrate adjacent to the substrate, wherein the substrate is located between the display layer and the conductive substrate. In use, the conductive substrate applies an electric field to the display layer, and the sets of particles of each microcapsule in the display layer are movable within the microcapsule by the electric field.

It is an advantage of the various embodiments described herein to provide a method for forming an electronic paper display which may apply microcapsules having two differently colored particles suspended in a display medium therein via ballistic aerosol marking, liquid xerography, ion-charging development or xerographical printing process, such as single component development, two component development or the like. Another advantage of the various embodiments is to provide a method for forming an electronic paper display which may dispense microcapsules having encapsulated reimageable media onto a substrate to form a high resolution colored display. Moreover, another advantage of the various embodiments is to provide a method for forming an electronic paper display which may be manufactured at a lower cost than a conventional display, such as a liquid crystal display or the like.

Additional features and advantages of the various embodiments are described herein and/or will be apparent from the description.

EMBODIMENTS

Figure 1:
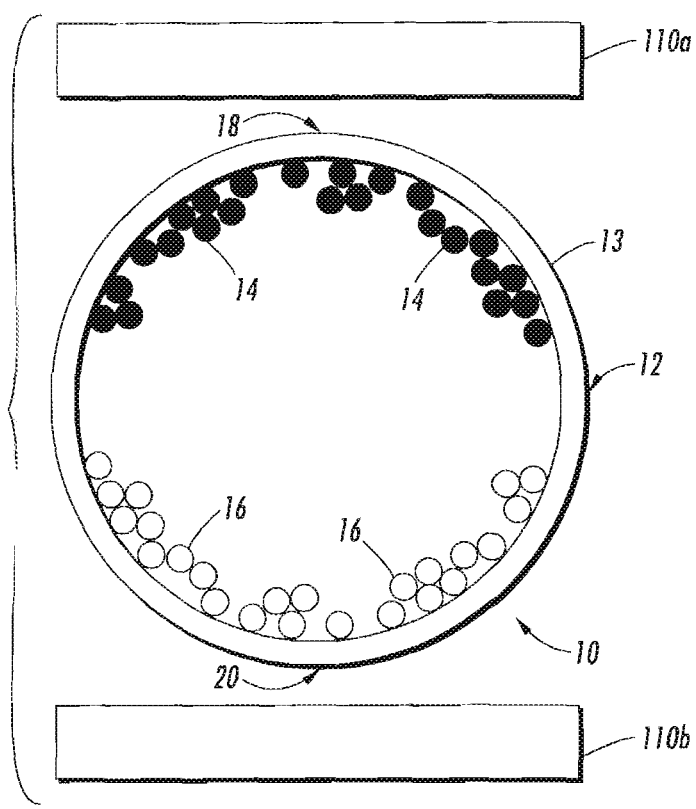
FIG. 1 is a cross-sectional view of a microcapsule having suspended sets of particles in a first state in an embodiment of the present disclosure.

Generally, in various exemplary embodiments, there is provided a method for producing an electronic paper display with microcapsules having encapsulated reimageable media suspended in a display medium. The encapsulated reimageable media may include, for example, at least two differently colored particle sets suspended in the display media, the differently colored particles being movable within the display medium by an electric field. The microcapsules may be applied to or developed on the substrate by ballistic aerosol marking, single component development or ion-charging development. In embodiments, a dry powder of microcapsules may be mixed with optional carrier particles or a carrier liquid prior to application to the substrate by two component development or liquid xerography, respectively.

After application or development of the microcapsules on the substrate, the microcapsules may form a display layer on the substrate. A resolution of the display layer of microcapsules, that is, the density of the microcapsules dispensed onto the substrate, may be based on or associated with a size of the microcapsules and/or a size of the carrier particles applied to the substrate. A coating may be applied to the display layer to protect the microcapsules and the substrate from damaging mechanical forces. The substrate and the microcapsules may be positioned between conductive substrates to form an electrophoretic display or a display device. The conductive substrates may be used to apply an electric field to the encapsulated reimageable media of the microcapsules to manipulate movement of the particles so that specific colors are seen by a viewer at locations and/or pixels, thereby displaying an image with the encapsulated reimageable media of the microcapsules.

A color display refers to, for example, any display capable of displaying at least two different colors. Examples include black and white colors, as well as full color displays such as red, green, blue and/or black, or cyan, magenta, yellow and/or black, and highlight color displays, including two colors highlighted and/or shaded with a third color.

In embodiments, the microcapsules encapsulate reimageable media (electrophoretic display medium) comprised of at least one fluid and at least one, for example at least two, such as from two to ten or from two to four, set(s) of colored particles dispersed in the fluid.

The encapsulated reimageable media comprises one or more sets of colored particles dispersed in a display medium or a fluid system. The display medium or the fluid may be either clear/transparent, or it may exhibit a visible color, for example a different, contrasting color from the color(s) exhibited by the sets of particles dispersed therein. A colored fluid is typically used in a display employing a single set of colored particles, for example white particles, with the Color of the fluid being a contrasting color other than white.

In embodiments, the fluid of the microcapsules and the set(s) of particles therein may have densities that are substantially matched, for example wherein the densities of these materials are within about 25% of each other, or more specifically within 20% of each other or within 10% of each other. The density of the colored particles and/or the electrophoretic particles for the encapsulated reimageable media may be substantially matched to that of the suspending fluid. For example, a suspending fluid may have a density that is "substantially matched" to the density of the colored particles and/or the electrophoretic particles dispersed therein if the difference in their respective densities is from about zero to about 2 g/ml, for example from about zero to about 0.5 g/ml.

The fluid may comprise from about 10% to about 95% by weight of the encapsulated reimageable media, for example from about 30% to about 90% or from about 40% to about 80% by weight of the display medium.

The fluid may be comprised of any suitable fluid known in the art for use in electrophoretic displays. Fluid refers to, for example, a material in a liquid state, and is not a gas or air. Of course, air or any other gas may also be present in the microcapsules of the display device, but the fluid of the microcapsules refers to a fluid in a liquid state. The choice of fluid may be based on concerns of chemical inertness, density matching to the particles to be suspended therein and/or chemical compatibility with the particles. In embodiments, the suspending fluid may have a low dielectric constant (for example, about 4 or less, such as about 0.5 to about 2). The viscosity of the fluid may be relatively low at the temperatures of operation in order to permit the particles to move therein, for example under the influence of an electrical field. In embodiments, the fluid may have a kinematic viscosity in the range of about 0.25 centistokes to about 10 centistokes, for example from about 0.5 centistokes to about 5 centistokes or from about 1 centistoke to about 2 centistokes, at about room temperature (about 23° C. to about 27° C.). The fluid may be dielectric and substantially free of ions. The fluid also may have minimum solvent action on the colored particles therein, and a specific gravity substantially equal to the colored particles, for example within about 20% of each other. Additionally, the fluid may be chosen to be a poor solvent for some polymers, which is advantageous for use in the fabrication of particles because it increases the range of polymeric materials useful in fabricating particles.

In embodiments, organic solvents such as halogenated organic solvents, saturated linear or branched hydrocarbons, silicone oils, and low molecular weight halogen-containing polymers are a few suitable types of fluids that may be used. Organic solvents may include, for example, epoxides such as, for example, decane epoxide and dodecane epoxide, vinyl ethers such as, for example, cyclohexyl vinyl ether, and aromatic hydrocarbons such as, for example, toluene and naphthalene. Halogenated organic solvents may include, for example, tetrafluorodibromoethylene, tetrachloroethylene, trifluorochloroethylene, 1,2,4-trichlorobenzene, carbon tetrachloride, mixtures thereof and the like. These materials may have high densities. Hydrocarbons may include, for example, decane, dodecane, tetradecane, xylene, toluene, hexane, cyclohexane, benzene, the aliphatic hydrocarbons in the ISOPAR™ (Exxon), NORPAR™ (a series of normal paraffinic liquids from Exxon), SHELL-SOL™ (Shell), and SOLTROL™ (Shell) series, naphtha, and other petroleum solvents. These materials may have low densities. Examples of silicone oils include octamethyl cyclosiloxane and higher molecular weight cyclic siloxanes, poly(methyl phenyl siloxane), hexamethyldisiloxane and polydimethylsiloxane. These materials may have low densities. Low molecular weight halogen-containing polymers may include, for example, poly(chlorotrifluoroethylene) polymer or KRYTOX™ polymers (Dupont).

Typically, hydrocarbon fluids such as ISOPAR M are used for electrophoretic ink applications due to their low cost, good dielectric strength, low volatility, and nonreactivity. Further, mixtures of above mentioned fluids are sometimes advantageous. For examples, it would be desirable to adjust or change the viscosity, density, and other physical properties of the fluid by mixing different fluids.

In embodiments, the aliphatic hydrocarbons may cause degradation of performance, for example when non-crosslinked emulsion aggregation particles are used as the colored particles of the encapsulated reimageable media and/or when the colored particles are imparted with a charge by treatment with a surface coating that can be desorbed from the particle surface in the presence of an aliphatic hydrocarbon. Thus, it may be desirable to use, as the fluid of the encapsulated reimageable media, a nonswelling fluid such as a silicone fluid. A commercially available silicone fluid includes DOW 200, a polydimethylsiloxane polymer available from Dow Corning. Other examples of suitable silicone fluids include polydimethylsiloxane fluids available from Gelest Corporation such as trimethylsiloxy terminated fluids DMS-T00, DMS-T01, DMS-T01.5, DMS-T02, DMS-T03, DMS- T05, DMS-T07, DMS-T11; cyclomethicones such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy)silane fluids such as SIP6827.0, phenethyltris(trimethylsiloxy)silane fluids such as SIP6722.8, and the like.

If colored, the fluid may be colored by any suitable means in the art, including through the inclusion of suitable dispersible colorants such as dyes and/or dispersible pigments therein.

In embodiments, the fluid is substantially free of charge control additives and other ionic species that may affect the charging behavior of the encapsulated reimageable media and/or the particles dispersed therein. However, in other embodiments, the fluid may contain additives such as surface modifiers to modify the surface energy or charge of the particles and such as charge control agents, dispersants, and/or surfactants.

In embodiments, the encapsulated reimageable media includes at least one set of particles exhibiting substantially the same color. The encapsulated reimageable media may be comprised of one set of colored particles, including at least two, such as from two to ten or from two to four, sets of differently colored particles dispersed in the fluid. Color refers to, for example, the overall absorption characteristic within the range of wavelengths of the electromagnetic spectrum. Substantially the same color herein refers to, for example, particles exhibiting substantially the same hue and contrast (darkness/lightness) as other particles in the set. Colored particles of different sets of particles in the encapsulated reimageable media exhibit a color, that is, an absorption characteristic, different from each other. For example, if a first set of particles exhibits a yellow color, then a second differently colored set of particles will exhibit a different shade (hue and/or contrast) of yellow or a different color altogether, for example such as cyan or magenta.

An encapsulated reimageable media may include two sets of differently colored particles, for example black particles and white particles. In embodiments, the encapsulated reimageable media comprises at least three differently colored sets of particles. As examples, the three sets of colored particles may comprise the three subtractive primary colors yellow, cyan and magenta, or may comprise red, blue and green. An example encapsulated reimageable media containing four sets of differently colored particles may comprise yellow, cyan, magenta and black. Additional differently colored sets of particles, for example for highlight coloring, may be included as additional sets of colored particles in any embodiment described herein.

In embodiments, it is desirable to have several different two particle microcapsules comprise a portion of the display equivalent to one pixel of the display. Each microcapsule in the pixel may include a set of white particles and a set on non-white particles, or different colors of two different non-white colors. For example, different microcapsules of a same pixel may comprise red/white, blue/white, green/white and optionally black/white, or red/green, blue/green, red/blue and optionally black/white, color combinations.

Each particle within a first set of particles may display, may present or may provide a first color. Further, each particle within a second set of particles may display, may present or may provide a second color different from the first color. In embodiments, a first set of particles may be a color, such as red, orange, yellow, green, blue, green or black, and a second set of particles may be white. Alternatively, the first set of particles may be a color and the second set of particles may be a different non-white color. In embodiments, the first set of particles may be one of cyan, yellow, magenta and black. Moreover, the second set of particles may be a different one of cyan, yellow, magenta and black than the first set of particles.

In embodiments, a third set of particles and/or a fourth set of particles may be optionally included with the first set of particles and second set of particles within the shell or suspended in the display medium of the microcapsules. For example, a first set of particles may be cyan, a second set of particles may be yellow, a third set of particles may be magenta and a fourth set of particles may be black. In embodiments, the third set of particles and/or the fourth set of particles may be colored particles or electrophoretic particles. The present disclosure should not be deemed as limited to specific embodiments of the sets of particles. It should be understood that the number of particles sets within the shell of the microcapsule may be any number of particles sets as known to one of skill in the art.

Each set of same colored particles in the microcapsules may comprise from about 5% to about 50% by weight, for example from about 5% to about 40% or from about 5% to about 30% by weight, of the microcapsules.

In embodiments, described is a low electrical conductivity electrophoretic encapsulated reimageable media, for example having a conductivity on the order of about $10^{-11}$ to about $10^{-15}$ S/m, such as from about $10^{-12}$ to about $10^{-14}$ S/m or from about $10^{-12}$ to about $10^{-13}$ S/m. The conductivity of the encapsulated reimageable media is thus comparable to that of the dielectric fluid. The particles of the encapsulated reimageable media may become charged by the application of a high electric field thereto, which may also be referred to as field-induced or in situ charging, in which particle charging is dependent on, for example, the field strength and the charging time (or number of charging cycles). Following charging, the particles may have a charge (charge to mass ratio) on the order of microcoulombs (μC) per gram (that is, on the order of $10^{-6}$ C/g), such as from about ±0.1 to about ±20 μC/g, from about ±0.2 to about ±10 μC/g or from about ±0.3 to about ±5 μC/g.

The microcapsules, including the fluid and particle sets therein, of embodiments herein may thus be made to be substantially free of charge control additives and similar excess ionic species affecting the charging characteristics and/or conductivity of the encapsulated reimageable media. Substantially free of ions herein refers, for example, to the encapsulated reimageable media being free of ionic species to the extent that the aforementioned conductivity values may be achieved. As a result, the encapsulated reimageable media herein is able to exhibit the aforementioned low conductivity properties.

As a result of the desired absence of charge control additives in the microcapsules, the particles of the sets of particles of the encapsulated reimageable media need to be made to include a capability of exhibiting the low charging property by other methods. Such may be accomplished, for example, by the formation of the particles in the presence of a surfactant and/or water, wherein small amounts of these materials may be incorporated into the particles during formation. Other components that could impart the charge to the particles include polymerization initiators such as APS (ammonium persulfate), chain transfer agents such as DDT (dodecylthiol), or acidic/basic functional groups in the polymer backbone that may be exposed or partially exposed on the particle surface. These materials may act as charge species in the particles, imparting an almost negligible charge at time zero but that which enables the particles to be charged, for example through application of a high electric field as will be described more fully below, to the low charge values described above. These materials are part of the particles and substantially do not become dissociated in the encapsulated reimageable media, thereby enabling the encapsulated reimageable media to maintain the low conductivity. Moreover, unlike prior systems requiring the presence of ionic species in the encapsulated reimageable media that permit the display to degrade in performance over time, for example through the generation of wrong sign particles and/or loss of sufficient ionic species in the medium, the particles herein do not generate ionic species and do not require the presence of ionic species for charging, and thus are not subject to such degradation risks.

As the particles of the encapsulated reimageable media, any particle made by any suitable process may be used, so long as the particles are capable of exhibiting the low charge property discussed above. Thus, particles made by both physical grinding methods, in which the material of the particles is formed as a mass that is then crushed and ground to the desired average particle size, and chemical build-up methods, in which the particles are grown individually within a reaction medium to the desired average particle size, both of which types of methods are well known in the toner art, may be used. The particles may be made to have an average size of from, for example, about 5 nm to about 100 µm, such as from about 10 nm to about 50 µm or from about 0.5 µm to about 25 µm. The particles have a size less than the size of the shells of the microcapsules in which the display medium will be contained so that the particles are free to move within the shells.

The particles may be neat pigments, dyed (laked) pigments, pigment/polymer composites, dyed or pigmented agglomerated polymer particles and the like. As the colorant of the particles, dyes, pigment, mixtures of dyes, mixtures of pigments or mixtures of dyes and pigments may be used. Particles and/or colorant of particles may also include laked, or dyed, pigments, in which a dye is precipitated on the particles or the particles are stained with a dye such as metal salts of readily soluble anionic dyes, for example dyes of azo, triphenylmethane or anthraquinone structure containing one or more sulphonic or carboxylic acid groupings precipitated by a calcium, barium or aluminum salt.

Typical manufacturing techniques for the above particles are drawn from the liquid toner and other arts and include ball milling, attrition, jet milling, and the like. A pigmented polymer particle may be made by, for example, compounding a pigment in the polymer. The composite material is then (wet or dry) ground to a desired size. It may then optionally be added to a carrier liquid and milled under high shear for several hours to a final particle size and/or size distribution.

Chemical processes that may be used in forming the particles include, for example, emulsion aggregation, dispersion polymerization, mini- or micro-emulsion polymerization, suspension polymerization, precipitation, phase separation, solvent evaporation, in situ polymerization, or any process of microencapsulation.

Polymers that may be used for the pigmented particles include, for example, polystyrene, polyethylene, polypropylene, phenolic resins, ethylene-vinyl acetate copolymers, polyesters, polyacrylates, polymethacrylates, ethylene acrylic acid or methacrylic acid copolymers, acrylic copolymers and terpolymers and the like. Specific example include, for example, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polystearyl methacrylate, polymethyl acrylate, polyethyl acrylate, polyacrylonitrile, and copolymers of two or more of these materials.

In embodiments, the particles for the encapsulated reimageable media are emulsion aggregation particles, for example including polyester resin based emulsion aggregation particles and styrene-acrylate or acrylate resin based emulsion aggregation particles. Such particles are chemically grown and tend to be substantially monodisperse in size and substantially spherical in shape. Another advantage to emulsion aggregation particles is that the particle surface is substantially completely passivated by the binder resin, which may eliminate the contribution of the colorant, such as pigment, to the particle charge.

As surfactants for use in making emulsion aggregation particles as discussed above, examples include anionic, cationic, nonionic surfactants and the like.

The particle preparation is typically carried out in an aqueous (water) environment as detailed above, and the electrophoretic encapsulated reimageable media is an non-aqueous environment (oil). When the particles are prepared, they are given a final water wash to remove excess surfactant. Trace amounts of residual surfactant on the surface of the particles, or trapped within the particles, may remain and contribute to the low conductivity of the particles. However, the amount of surfactant that actually gets into the oil is very low, since it prefers to be in water. As a result, the fluid medium has a desired low conductivity.

In embodiments, the emulsion aggregation particles are made to have an average particle size of from about 0.5 to about 25 µm, for example about 5 to about 15 µm or about 5 to about 12 µm. The particle size may be determined using any suitable device, for example a conventional Coulter counter.

Although not required, the toner may also include additional known positive or negative charge additives in effective suitable amounts of, for example, from about 0.1 to about 5 weight % of the toner, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

Examples of pigments that may be used as the particles herein, or that may be used as the colorant in polymer particles, include neat pigments such as, for example, titania, barium sulfate, kaolin, zinc oxide, carbon black and the like. The pigment should be insoluble in the suspending fluid. Additional pigments may include, for example, carbon black such as REGAL 330 carbon black, acetylene black, lamp black, aniline black, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST®Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM, Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); mixtures thereof and the like.

In polymer particles, the colorant may be included in the particles in an amount of from, for example, about 0.1 to about 75% by weight of the particle, for example from about 1 to about 50% by weight or from about 3 to about 25% by weight of the particle.

In any of the foregoing particle embodiments, the particles may also include one or more external additives on the surfaces thereof. Such external additives may be applied by blending, for example with a Henschel blender. In embodiments, the external additive package may include one or more of silicon dioxide or silica ($SiO_2$), titanium dioxide or titania ($TiO_2$), titanic acid, cerium oxide, calcium or zinc stearate, and the like. The particles may have an average size (diameter) of from about 5 μnm to about 250 nm. Mixtures of differently sized particles may also be used, for example a first silica having an average primary particle size, measured in diameter, in the range of, for example, from about 5 nm to about 50 nm, such as from about 5 nm to about 25 nm or from about 20 nm to about 40 nm and a second silica having an average primary particle size, measured in diameter, in the range of, for example, from about 100 nm to about 200 nm, such as from about 100 nm to about 150 nm or from about 125 nm to about 145 nm. The external additive particles may also be treated with a surface material.

In embodiments, the external additives may be used to impart charge to the particles. For example, a silica particle treated with polydimethylsiloxane (PDMS) or hexamethyldisilane (HMDS) can impart a positive charge. A titanic acid treated with isobutyl trimethoxysilane can impart a negative charge.

In embodiments, the microcapsules may be made to have a size (diameter) of from, for example, about 5 microns to about 1,000 microns, such as from about 5 to about 200 microns or from about 5 to about 50 microns.

For making the microcapsules, any suitable method of encapsulation may be used. The process of encapsulation may include conventional or complex coacervation, interfacial polymerization, in-situ polymerization, electrolytic dispersion and cooling, or spray-drying processes. In these processes, the display medium is added to a solution of the wall-forming material to be encapsulated thereby, and the resulting encapsulated microspheres may be subjected to crosslinking. The microcapsules may be prepared using melamine-formaldehyde, urea-formaldehyde, resorcinol-formaldehyde, phenol-formaldehyde, gelatin-formaldehyde, isocyanate-polyol, interpolymer complexes of two oppositely charged polymers such as gelatin/gum arabic, gelatin/polyphosphate, and poly(styrene sulfonic acid)/gelatin, hydroxypropyl cellulose, mixtures and/or combinations of the foregoing, and the like, as microcapsule wall-forming materials.

The interfacial polymerization approach may rely on the presence of an oil-soluble monomer in an electrophoretic composition, which is present as an emulsion in an aqueous phase. The monomers in the minute hydrophobic droplets may react with a monomer to be introduced into the aqueous phase, polymerizing at the interface between the droplets and the surrounding aqueous display medium and forming shells around the droplets. Although the resulting walls are relatively thin and may be permeable, this process does not require the elevated temperatures characteristic of some other processes, and therefore affords greater flexibility in terms of choosing the display medium.

Coating aids may be used to improve the uniformity and quality of printed or developed electrophoretic microcapsules. Wetting agents are typically added to adjust the interfacial tension at the microcapsule/substrate interface and to adjust the liquid/air surface tension. Wetting agents include, for example, anionic and cationic surfactants, and nonionic species, such as silicone or fluoropolymer-based materials. Dispersing agents may be used to modify the interfacial tension between the microcapsules and binder or the substrate, providing control over flocculation and particle settling.

Surface tension modifiers may be added to adjust the air/ink interfacial tension. Polysiloxanes are typically used in such an application to improve surface leveling while minimizing other defects within the coating. Surface tension modifiers include, for example, fluorinated surfactants, such as, for example, the ZONYL series from DuPont, the FLUORAD series from 3M (St. Paul, Minn.), and the fluoroalkyl series from Autochem; siloxanes, such as, for example, SILWET from Union Carbide; and polyethoxy and polypropoxy alcohols. Antifoams, such as silicone and silicone-free polymeric materials, may be added to enhance the movement of air from within a microcapsule formation solution to a surface of the substrate and to facilitate the rupture of bubbles at the surface. Other useful antifoams include, for example, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the microcapsules.

The coacervation approach may utilize an oil/water emulsion. One or more colloids are coacervated (that is, agglomerated) out of the aqueous phase and deposited as shells around the oily droplets through control of temperature, pH and/or relative concentrations, thereby creating the microcapsule. Materials suitable for coacervation include gelatins and gum arabic.

In an example complex coacervation process, the display medium to be encapsulated is emulsified with the wall forming material, for example a mixture of water, gelatin and gum arabic, at an elevated temperature of, for example, about 30° C. to about 80° C. such as from about 35° C. to about 75° C. or from about 35° C. to about 65° C. The pH is then reduced, for example to less than 5, for example from about 4 to about 5 such as from about 4.4 to about 4.9, through addition of an acid such as acetic acid and the like, to induce coacervation. The material of the wall of the microcapsules may then be crosslinked, for example by adding gluteraldehyde and the like and agitating the mixture in the presence of, for example, urea.

The microcapsules may have a multi-layer wall around the particles suspended within the display medium to define a shell of each microcapsule. These can be made, for example, by first forming a thin wall by an interfacial polymerization reaction, and subsequently forming a second, thicker wall by an in-situ polymerization reaction or by a coacervation process. The first wall of the microcapsule may be typically comprised of polyurea, polyurethane, polyamide, polyester, epoxy-amine condensates, silicones and the like. The second wall of the microcapsule may be comprised of condensates of melamine-formaldehyde, urea-formaldehyde, resorcinol-formaldehyde, phenol-formaldehyde, gelatin-formaldehyde, or interpolymer complexes of two oppositely charged polymers such as gelatin/gum arabic and poly(styrene sulfonic acid)/gelatin.

A semi-continuous miniemulsion polymerization process may also be used to encapsulate the electrophoretic display medium or the particles, for example as described in U.S. Pat. No. 6,529,313, incorporated herein by reference in its entirety.

A benefit of encapsulating the electrophoretic display medium is that the microcapsules can be made to be spherical or other than spherical through control of the process. Different shapes may permit better packing density of the microcapsules and better display quality.

Once generated, the microcapsules may then be applied to a substrate by a known xerographical printing process, such as single component development or two component development. Alternatively, the microcapsules may be applied to the substrate by another known printing or application process, such as ballistic aerosol marking, liquid xerography, ion-charging development or the like.

In embodiments, the microcapsules may be mixed with or without carrier particles and then printed on or developed on a substrate by, for example, known xerographical printing processes. The carrier particles may be optionally mixed with the microcapsules to form a two component developer. Without the carrier particles, the microcapsules may be referred to a single component developer. The microcapsules may adhere to the surface of the substrate by, for example, using any suitable binder such as an adhesive or polymer matrix material that is either mixed with the microcapsules prior to developing the microcapsules on the substrate, coated onto the substrate before development of the microcapsules thereon, coated upon the microcapsules after developing on the substrate, or one or more of the above, including all three.

As an adhesive or binder, any material may be used, for example including polyvinyl alcohol (PVA) or polyurethane such as NEOREZ, A binder may be used as an adhesive medium that supports and protects the microcapsules, as well as binds conductive substrate to the microcapsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among water-soluble polymers are various polysaccharides, polyvinyl alcohols, N-methylpyrrolidone, N-vinylpyrrolidone, various CARBOWAX species (Union Carbide), and poly(2-hydroxyethyl acrylate).

The water-dispersed or water-borne systems are generally latex compositions, for example NEOREZ and NEOCRYL resins (Zeneca Resins), ACRYSOL (Rohm and Haas) BAY-HYDROL (Bayer), and the HP products (Cytec Industries). These may generally be lattices of polyurethanes, occasionally compounded with one or more of acrylics, polyesters, polycarbonates or silicones, each lending the final cured resin in a specific set of properties defined by glass transition temperature, degree of tack, softness, clarity, flexibility, water permeability and solvent resistance, elongation modulus and tensile strength, thermoplastic flow, and solids level. Some water-borne systems may be mixed with reactive monomers and catalyzed to form more complex resins. Some may be further cross-linked by the use of a cross-linking reagent, such as an aziridine, for example, which reacts with carboxyl groups.

The microcapsules may be dried to form the dry powder of microcapsules without the carrier particles. Suitable drying processes may include fluidized bed, freeze drying or the like. The surface of the dry powder without the carrier particles may be blended with charge control agents or flow aid agents to enhance the triboelectrical charge capability and the flow property of the dry powder. Both charge and flow properties for the microcapsules without the carrier particles may be maintained such that the dry powder may be utilized in single component development. Thus, the dry powder of microcapsules may be used the same as or similarly as a toner or a single component developer in single component development.

Any suitable single component development technique may be utilized to charge the microcapsules without carrier particles or single component developer for transferring to the substrate. The dry powder of microcapsules may be deposited on a magnetic developer roller which may be charged by a voltage for forming charged particles of microcapsules. For example, a portion of a drum bearing a latent image may be rotated to a developer subassembly where a latent image is developed with the dry powder of microcapsules using a magnetic developer roller or blade of a process cartridge module to form charged particles of microcapsules. The developed image on the drum is then rotated to a near vertical transfer point where the dry powder or charged particles of microcapsules may be transferred to the substrate.

For two component development, carrier particles may be added to the dry powder to develop the dry powder on the substrate. The dry powder of microcapsules may be mixed with the carrier particles to form a two component developer composition for the two component development process. For the formulation of the two component developer, the dry powder of microcapsules may be mixed with carrier particles, particularly those that are capable of triboelectrically assuming an opposite polarity to that of the developer composition. For example, the particles of the carrier are selected to be of a positive polarity enabling the particles of the dry powder, which are negatively charged, to adhere to and surround the carrier particles or vise versa.

Any suitable two component development technique may be utilized to charge the microcapsules or two component developer to form charged particles for development and transfer the microcapsules to specific locations on the substrate. The charged particles of microcapsules may be positioned at the specific locations on the substrate by conventional two component development techniques. For example, portions of a photoreceptor may be charged to form a latent image on the photoreceptor. The latent image on the photoreceptor may be developed with the charged particles of microcapsules wherein the charged particles of microcapsules are transferred to the substrate. The charged particles of microcapsules on the substrate form a display layer of microcapsules thereon.

Examples of suitable carrier particles for mixing with the microcapsules may include iron powder, steel, nickel, iron, and/or ferrites, including copper zinc ferrites, and the like. In embodiments, nickel berry may be utilized as carrier particles as illustrated in U.S. Pat. No. 3,847,604, the disclosure of which is totally incorporated herein by reference. The carrier particles may have a coating that may generally contain terpolymers of styrene, methylmethacrylate, and a silane, such as triethoxy silane, as illustrated in U.S. Pat. Nos. 3,526,533, 4,937,166, and 4,935,326, the disclosures of which are totally incorporated herein by reference, including for example KYNAR® and polymethylmethacrylate mixtures (40/60) or carbon black loaded polymethylmethacrylate late mixtures. Coating weights can vary as indicated herein; generally, however, from about 0.3 to about 2, and preferably from about 0.5 to about 1.5 weight percent coating weight is selected.

Furthermore, a diameter of the carrier particles, which may preferably be spherical in shape, may generally from about 50 microns to about 1,000 microns, and in embodiments from about 100 to about 230 microns thereby permitting the carrier particles to possess sufficient density and inertia to avoid adherence to the electrostatic images during the development with the printing process. The carrier particles may be mixed with the dry powder of microcapsules in various suitable combinations, such as about 1 to about 10 parts per dry powder to about 5 parts to about 220 parts per carrier, specifically about 1 to about 5 parts per dry powder to about 10 parts to about 200 parts by weight of carrier.

The microcapsules may have external additive particles including flow aid additives, which may be present on the particles of the dry powder. Examples of suitable external additives include colloidal silicas, such as AEROSIL®, metal salts and metal salts of fatty acids inclusive of zinc stearate, aluminum oxides, cerium oxides, and mixtures thereof as disclosed in U.S. Pat. Nos. 3,590,000 and 3,800,588, the disclosures of which are totally incorporated herein by reference. The external additives may be present in the dry powder of microcapsules in an amount of from about 0.1% by weight to about 10% by weight, and specifically in an amount of from about 0.1% by weight to about 5% by weight, which are illustrated in U.S. Pat. Nos. 3,590,000 and 3,800,588, the disclosures of which are totally incorporated herein by reference.

In embodiments, the different color combinations of the charged microcapsules may be transferred to the substrate. For example, microcapsules with different particle set color combinations therein may be developed on the photoreceptor to form a "built up" image of differently colored microcapsules thereon. The differently colored microcapsules may be developed on the photoreceptor by transferring single-colored microcapsules from multiple developing stations onto the photoreceptor. In embodiments, the differently colored microcapsules may be developed on the photoreceptor by performing multiple passes of the photoreceptor to transfer different color combination microcapsules to the photoreceptor. The "built up" image of the differently colored microcapsules may be transferred from the photoreceptor to the substrate. The differently colored microcapsules on the substrate may form or may define a display layer of microcapsules thereon.

The microcapsules may also be transferred to the substrate by a dry toner direct development method. With the dry toner direct development method, the dry powder of microcapsules may be charged and ejected directly onto a final substrate. Thus, when printing via a dry toner direct development method, a photoreceptor is not used to transfer the dry powder of microcapsule to the final substrate. After charging the dry powder, the charged microcapsules of the dry powder may be deposited directly onto the specific locations on the final substrate by a guiding device with an electrical field.

An example of a suitable direct development may include, for example ballistic aerosol marking or the like as illustrated in U.S. Pat. Nos. 6,925,281, 6,424,364 and 6,276,792, the disclosures of which are totally incorporated herein by reference. For example, the microcapsules may be generated in an aerosol form, excited by gas flow and sonic or ultrasonic vibration, or by mechanical/gas excitation with a rotating mechanical arm, such as a propeller. Alternatively, microcapsules may be supplied in a liquid form (loosely packed, readily flowing) to channels of a print head by a sonic/ultrasonic vibration and gas flow. Transferring the microcapsules may be achieved by launching non-colloidal, solid or semi-solid particulate, or alternatively liquid, microcapsules at a substrate. The shape of the channel of the print head may result in a collimated (or focused) flight of a propellant, microcapsules and/or charged particles onto the substrate.

The microcapsules may also be transferred to the substrate by a liquid development process, such as liquid xerography. For liquid xerography, the microcapsules may be suspended in a liquid carrier, such as, a dielectric fluid or the like to form a liquid developer. The liquid developer may have about two percent by weight microcapsules distributed in the liquid carrier. An electrostatic latent image may be developed by applying the liquid developer to a photoreceptor, whereby the microcapsules are selectively attracted to the surface of the photoreceptor in accordance with an electrostatic latent image. The microcapsules on the surface of the photoreceptor may be charged particles and may be transferred to the substrate.

Some liquid developing systems perform an image-on-image (IOI) process in which successive layers of microcapsules may be "built up" on a photoreceptor to create a differently colored microcapsule image thereon. Therefore, in an IOI process, after a first microcapsule layer is formed on the photoreceptor, the photoreceptor typically must be recharged and exposed before a next microcapsule layer can be deposited on the photoreceptor. One process for recharging a photoreceptor is a "split recharge" process, in which a first charging device overcharges the photoreceptor and a second charging device applies a charge of opposite polarity to the photoreceptor to reduce the level of charge on the photoreceptor. In embodiments, a first charging device, such as a corona charging device, overcharges the photoreceptor to a level higher than a desired voltage level for exposure. A second charging device applies a charge of opposite potential to the photoreceptor to reduce the charge level on the photoreceptor to a desired pre-exposure level. After the differently colored microcapsule image is created on the photoreceptor, the image of charged particles may be transferred to the substrate from the photoreceptor.

The microcapsules may also be transferred to the substrate by an ion-charging process or the like. An ion toner-charging device may subject an airborne stream of microcapsules to unipolar gas ions in the presence of an applied alternating electric field. For example, negative or positive ions may be directed at the airborne stream of microcapsules. As a result, the negative or positive ions may be deposited on the microcapsules to form charged particles of microcapsules. The microcapsules may be uniformly charged to a Pauthenier charging limit. Ion charged microcapsules enable reduced adhesion for improved electrophotographic development, electrostatic transfer and cleaning. The ion charged microcapsules may be used to directly develop an electrostatic image, donor rolls for the development of an electrostatic image, or additional charged microcapsules may be added to a conductive two-component developer for developing either donor rolls or directly developing an electrostatic image. The ion charged microcapsules may be charged particles and may be transferred to the substrate.

In the display layer formed on the surface of the substrate formed by the charged particles having microcapsules, the microcapsules may be arranged in abutting, side-by-side relationship and in embodiments are arranged in a monolayer (that is, the microcapsules are not stacked) on the substrate.

However, more than one display layer of microcapsules may also be used. In embodiments, the electronic display may be formed by at least one display layer of microcapsules, for example, one to ten display layers of the microcapsules, such as one to four display layers of the microcapsules or one to two display layers of the microcapsules. The electronic display may be formed by sandwiching the substrate with at least one display layer of microcapsules between a first or front conductive substrate and a second or rear conductive substrate. If desired, different display layers of the microcapsules applied to the surface of the substrate may be used for different color display mediums. The display layer of microcapsules may have a thickness of from about 5 to about 1,000 µm, for example from about 10 to about 500 µm or from about 20 to about 350 µm. This embodiment thus relates to a way of incorporating the microcapsules and the display medium into a display layer of electronic display or an electrophoretic display device that can easily be applied to create large area display devices on a substrate.

In embodiments, the electronic display device may also be made to include an absorptive backplane, for example a light absorptive backplane. Very thin display devices with substantially clear conductive substrates such as indium tin oxide (ITO) coated glass or ITO coated polymer such as MYLAR may exhibit low optical density, and a washed out appearance with low color saturation. A highly absorptive backplane may reduce the light transmission through the electronic device, thereby eliminating the washed out appearance of the display. The contrast is greater, and the color saturation appears higher.

The absorptive backplane may desirably have a black color. This may be achieved by any suitable method. For example, a black colored film or paint may be added onto the substrate having the display layer of microcapsules thereon. The absorptive backplane may be applied either before or after formation of the display, for example, before application of the charged particles of microcapsules to the substrate, or after applying the display layer of microcapsules onto the substrate. Also, the coloring agent imparting the dark color such as black may be incorporated directly into the substrate having the display layer of microcapsules or onto the rear conductive substrate, such that the rear conductive substrate acts as both the conductive layer and the absorptive backplane.

In embodiments, a protective layer may be sprayed onto and may coat the display layer of microcapsules. The display layer may be covered or substantially covered by the protective layer. As a result, the protective layer may provide mechanical protection for the substrate and/or the microcapsules by covering or substantially covering the microcapsules. In embodiments, the protective layer may be made from a polymer, such as, for example, a thermoplastic or the like. Additionally, the polymers may be dissolved in a suitable solvent that may subsequently be coated as a film over the display layer of microcapsules. Examples of suitable thermoplastics may include polystyrene, PMMA, polycarbonate, PVA or the like.

Controlling movement of the encapsulated reimageable media (the sets of particles) within the microcapsules and controlling image formation by the encapsulated reimageable media within the microcapsules is described in application Ser. No. 11/419,440, filed May 19, 2006, which is incorporated herein by reference in its entirety.

The substrate and the display layer may be sandwiched between the conductive substrates to define an electrophoretic display device. In operating the microcapsules or the display layer of microcapsules of the electrophoretic display device so as to form an image therewith, an electric field, in particular a reversible direct current or an alternating current, is applied directly to or adjacent to the microcapsules in the display layer of the device by at least one of the conductive substrates. As a result, the electric field may move one or more desired or intended particle sets in the microcapsules so as to be displayed by the display device.

In embodiments of the display device, each of the individual microcapsules may be individually addressable, that is, a separate electric field may be applied to each individual microcapsule in the display layer to generate an appropriate color at that individual microcapsules. Appropriate sets or groups of different ones of the individual microcapsules may also be associated with a same driving electrode in one or more of the conductive substrates. For example, in a display device, each microcapsule or a set of microcapsules in the display layer may represent a pixel or sub-pixel of an image, and each pixel or sub-pixel may thus be separately controlled to generate a desired overall image from the display device.

Control methods, including hardware/software, for controlling each microcapsule in the display layer of the display device in a manner enabling an overall image to be shown are known in the display arts, and any such control method may be applied herein. To permit individual addressability, the size of the electrodes of the conductive substrates may be the same as or smaller than the size of the individual microcapsule of the display device, enabling individual control of each. In this manner, the electric field applied to each microcapsule can be individually controlled. Also, the size of the electrodes can be different from (for example, larger than) the size of the microcapsules, thereby enabling more than one microcapsule to be controlled by a single electrode where the electrode is larger than an individual microcapsule, or also enabling only a portion of the microcapsule to be controlled (turned on and off) by an electrode where the electrode is smaller than the size of the microcapsule. That is, the pattern of the electrodes does not need to line up with the microcapsules. Any of the foregoing can be done by, for example, appropriate patterning of the conductive path on the rear conductive substrate. An example of the patterning of electrodes can be found in, for example, U.S. Pat. No. 3,668,106, incorporated herein by reference in its entirety.

The strength of the electric field that may be applied to effect movement of the particles may be defined as the voltage divided by the thickness of the gap between the two conductive substrates. Typical units for electric field are volts per micron (V/µm). In embodiments, the charge level of each particle may have an electric field ranging from about 0.5 to about 3 V/µm. Applied electric fields may range from about 0.1 V/µm to about 25 V/µm, for example from about 0.25 V/µm to about 5 V/µm, or from about 1 V/µm to about 2 V/µm, or any ranges in between. The duration of electric field application can range from about 10 msec to about 5 seconds, or from about 100 msec to about 1 second, or any ranges in between. Generally, the greater the charge on the particles, the faster the particles will move for a given electric field strength.

The above controls over the display of colors in a multicolor system may be applied to a display layer of microcapsules containing any number of differently colored particle sets, for example including two, three, four or even more particle sets. Highlight color particle sets, for example blue highlight color, red highlight color, green highlight color and the like highlight color particle sets may be included in multicolor particle sets to add additional color range capabilities to the display, and the control of the colors may be effected as described above. The total particle sets, including highlight color particle sets, in the display medium thus may be five, six, seven, eight or even more.

Figure 2:
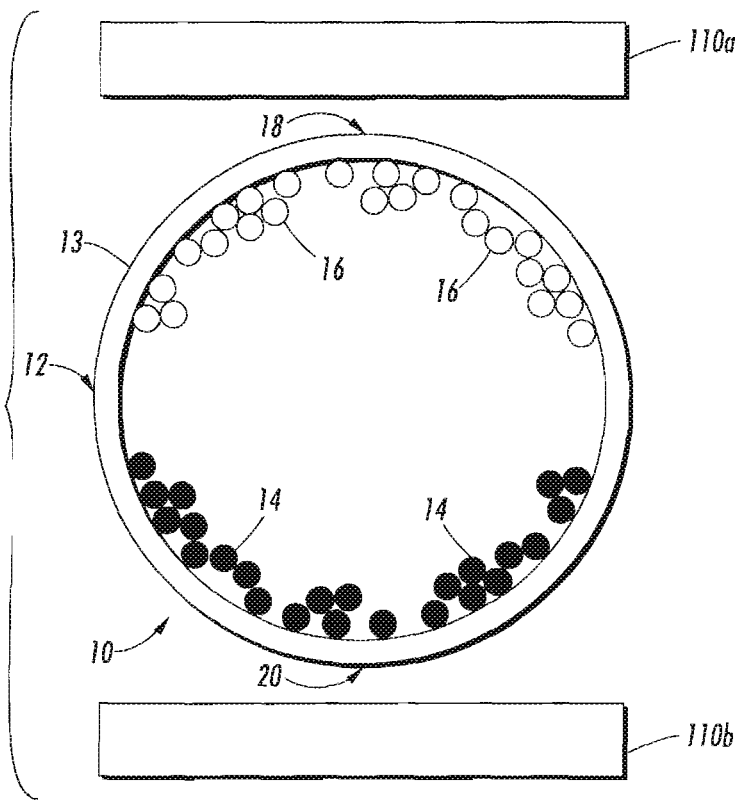
FIG. 2 is a cross-sectional view of a microcapsule having suspended sets of particles in a second state in an embodiment of the present disclosure.

Referring now to the drawings wherein like numerals refer to like parts, FIGS. 1 and 2 illustrate a microcapsule 10. In embodiments, the microcapsule 10 may be, for example, an electrophoretic microcapsule having at least two differently colored sets of particles suspended in the display media therein. In embodiments, the microcapsule 10 may encapsulate the particles as described above.

The microcapsule 10 may have a shell 12 that encapsulates a first set of particles 14 and/or a second set of particles 16 (hereinafter "sets of particles 14, 16") as shown in FIGS. 1 and 2 and described above. The sets of particles 14, 16 may be suspended in the display medium within the shell 12 of the microcapsule 10, and may be located in a color mode or in a white mode as illustrated in FIGS. 1 and 2, respectively. In embodiments, the shell 12 of the microcapsule 10 may have an outer surface 13 that may have the adhesive thereon as described above.

FIGS. 3-6 and 9 illustrate a method 200 for producing a color electrophoretic display 100 (hereinafter "display 100") with multiplicity of microcapsules 10. The display 100 may be, for example a four-color display with high resolution (hereinafter "our-color display") or a highlight two-color display with high resolution (hereinafter "two-color display"). In embodiments, the four-color display may include full color, such as red, green, blue and black. In embodiments, the two-color display may include a non-white color and white, black and white or two different non-white colors. A two-color display and a four-color display refers to, for example, any display capable of displaying two different colors and four different colors, respectively. Examples include black and white colors, as well as full color displays such as red, green, blue and/or black, or cyan, magenta, yellow and/or black, and highlight color displays, including two colors highlighted and/or shaded with a third color and/or a fourth color.

Figure 3:
FIGS. 3-6 are steps for forming an electrophoretic display in an embodiment of the present disclosure.

In FIG. 3, a substrate 102 may be provided for receiving the microcapsules 10 to form the display 100. In embodiments, the substrate 102 may be made of a flexible material, such as, for example, a plastic or the like. Examples of suitable plastics may include PET, such as Mylar or polyethylene terepthalate, PEN (polyethylene napthalate), PES (polyether sulfone) or the like. In alternative embodiments, the substrate 102 may be made from, for example, glass or the like.

Figure 9:
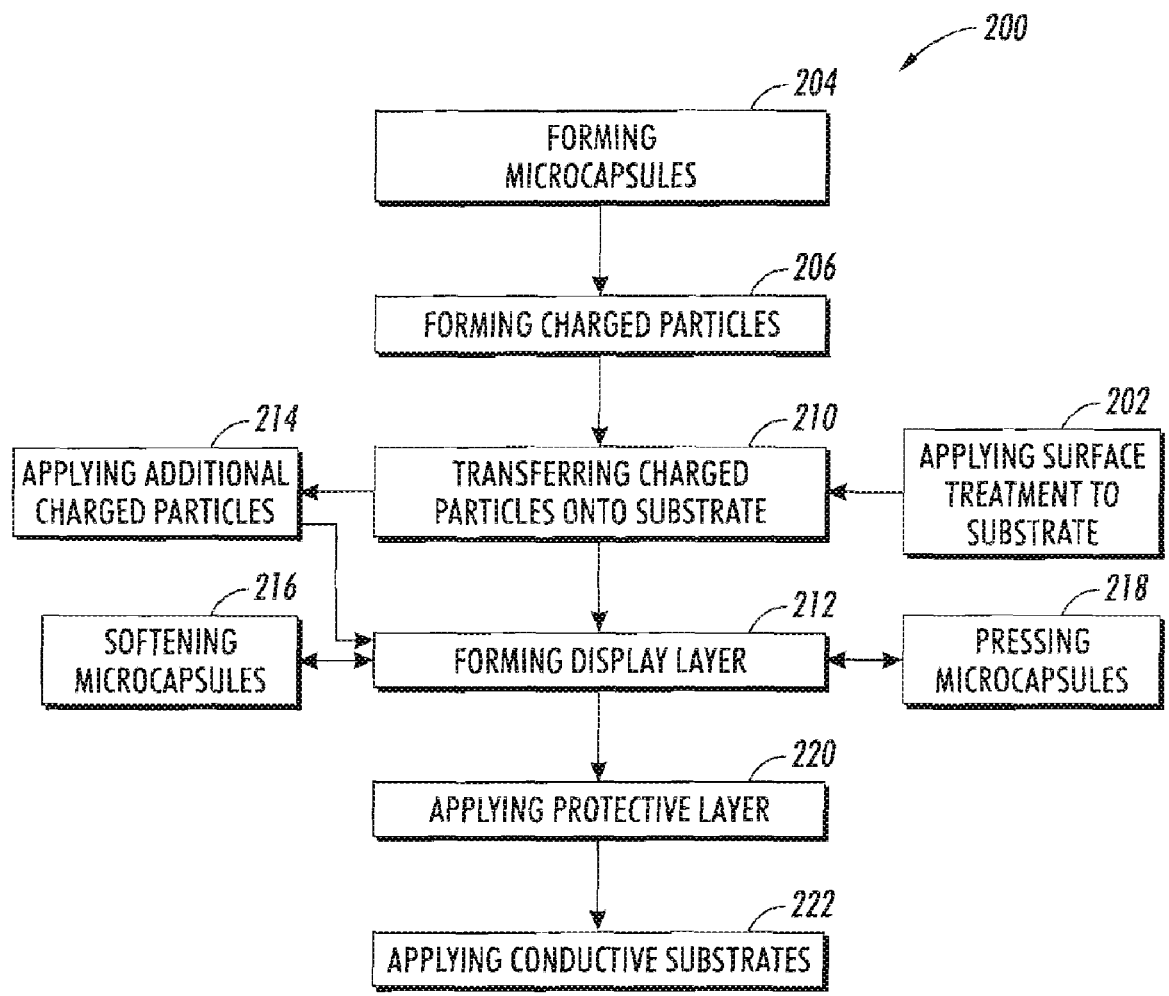
FIG. 9 is a flow chart of a method for forming an electrophoretic display in an embodiment of the present disclosure.

A surface treatment may be applied to the substrate 102 for enhancing or increasing adhesive characteristics of the substrate 102 as shown at step 202 in FIG. 9. The surface treatment may relate to or be substantially similar to a surface treatment that may be applied to a transparency for adhering toner to the transparency when the toner is applied by a printing or a xerographic process. In embodiments, the substrate 102 may not have the surface treatment applied thereon. Thus the substrate 102, with or without surface treatment, may enhance adhesion of charged particles of microcapsules 10 to one or more of the conductive substrates during transfer of the charged particles.

The microcapsules 10 may be formed to provide the four-color display or the two-color display. In embodiments, the microcapsules 10 may be formed in the microcapsule formation solution. However, residue microcapsule formation solution may remain after formation of the microcapsules 10. The microcapsules 10 and the residue microcapsule formation solution may be subsequently dried with heat, with slight heat or with no heat to form dry powder containing the microcapsules 10 to form a single component developer.

Carrier particles may be added to, mixed with or combined with the dry powder of microcapsules 10 to form a two component developer. As a result, the carrier particles and/or the dry powder of microcapsules may form or may define a microcapsule developer for developing or printing on the substrate 102. The microcapsule developer may be capable of being transferred to or developed on the substrate 102) during the printing or xerographical process, such as single component developer or two component developer.

Alternatively, the microcapsules 10 may suspended in a liquid carrier, such as a dielectric fluid for transferring to the substrate by liquid xerography or the like. In embodiments, the microcapsules 10 may be generated in an aerosol form or a liquid form to be launched and transferred to the substrate by ballistic aerosol marking or the like. In yet another embodiment, the microcapsules 10 may be generated into a airborne stream to be charged and transferred to the substrate by ion-charging development or the like.

The microcapsules 10 may be electrostatically charged by a known charging method to form charged particles of microcapsules 10 as shown at step 206 in FIG. 9. The charging method for the microcapsules 10 may be, for example, an ion-charging process, a triboelectric charging process or the like. As a result, charged particles of microcapsules 10 may be electrostatically charged by the charging method. The present disclosure should not be deemed as limited to a specific embodiment of the charging method for the microcapsules 10.

In embodiments, during the transferring of the charged particles of microcapsules 10 to the substrate 102, a photoreceptor may have an electrostatic charge distributed thereon for transferring the charged particles of microcapsules 10. As a result, the charged particles of microcapsules 10 may be transferred onto the substrate 102 as shown at step 210 in FIG. 9. The electrostatic charge of the photoreceptor may be uniformly or non-uniformly distributed over the surface of the photoreceptor by a corona discharge. The electrostatic charge may form an electrostatic latent image that may or may not extend continuously across the photoreceptor. The electrostatic charge of the photoreceptor may be opposite to the electrostatic charge of the microcapsule developer.

During transferring of the charged particles of microcapsules 10 to the substrate 102, the photoreceptor may pass over or adjacently to a developer unit which may house or may store the microcapsules 10. The microcapsules 10 may be transferred to and/or may be attracted to the electrostatic latent image on the surface of the photoreceptor. As a result, a layer of the microcapsules 10 may be positioned on the surface of the photoreceptor for subsequent transfer onto the substrate 102.

Figure 4:
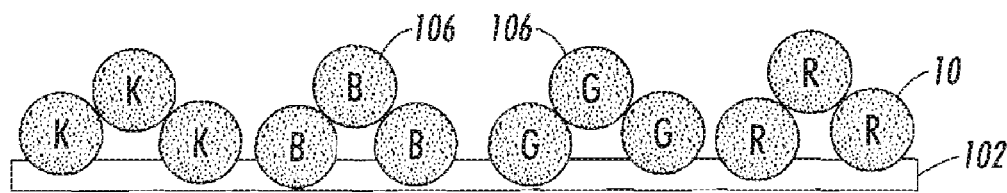

The microcapsules 10 that have been transferred to the substrate 102 may form or may define a display layer 106 of microcapsules 10 on the substrate 102 as illustrated in FIG. 4 and as shown at step 212 of FIG. 9. The display layer 106 on the substrate 102 may form or may define a color density for the microcapsules 10 on the substrate 102. In embodiments, the display layer 106 of the microcapsules 10 may have a thickness of from, for example, about 5 to about 1,000 μm, such as from about 10 to about 500 μm or from about 20 to about 350 μm. In embodiments, the color density formed or defined by the display layer 106 may be continuous, uninterrupted and/or consistent across the substrate 102. In embodiments, the display layer 106 of the microcapsules 10 may form a monolayer (a layer having a thickness substantially corresponding to the average diameter of the microcapsules 10 of that display layer 106) in a display layer 106 of the display device. However, multiple display layers, for example 2 to about 10 or 2 to about 4, may also be used.

In embodiments, to form a display device that may be capable of displaying multiple colors or full color, more than one display layer 106 may be applied to the substrate 102 via the photoreceptor. For example, with a first pass of a photoreceptor, a first display layer having microcapsules 10 that may contain a set of red particles and a set of white particles may be developed on the substrate 102. As a result, the microcapsule 10 of the first layer may define a first subpixel of each pixel for the display device. With a second pass, a second display layer having microcapsules 10 that may contain a set of blue particles and a set of white particles may be developed on the substrate 102 to define a second subpixel for each pixel of the display device. With a third pass, a third display layer having microcapsules 10 that may contain a set of green particles and a set of white particles may be developed on the substrate 102 to define a third subpixel for each pixel of the display device. With a fourth pass, a fourth display layer having microcapsules 10 that may contain a set of black particles and a set of white particles may be developed on the substrate 102 to define a fourth subpixel for each pixel of the display device. Of course, the different color combinations of the microcapsules 10 may all be developed together from a photoreceptor that may that may have one or more layers of microcapsule developers on the surface of the photoreceptor.

The microcapsules of the first, second, third and fourth display layers may define the four subpixels for each pixel of the display device. Each subpixel may be capable of displaying a colored particle or a white particle. As a result, each pixel of the display device may be capable of displaying full color, white or multiple colors, i.e., red, blue, green and black. The colored particles and white particles in each microcapsule for each subpixel may be controlled to display a color or white to provide full color images.

In embodiments, the photoreceptor, in a single pass, may develop or may print a single display layer having microcapsules onto the substrate to define more than one subpixel for each pixel, such as two subpixels or four subpixels for each pixel of the display device. The photoreceptor may develop or may print microcapsules, in a single pass or in more than one pass, onto the substrate 102 to provide desired colored particles in one or more subpixels for each pixel of the display device. As a result, the printer heads may control dispersion of one or more display layers of microcapsules having one or more desired colored particles within subpixels forming pixels capable of displaying two or more colors.

In embodiments, the optional adhesive on the surface 13 of the microcapsules or substrate may adhere, may retain or may bond the microcapsules 10 of the dry powder or the display layer 106 to the substrate 102. Thus, the microcapsule 10 or the display layer 106 may be adhered to, may be retained on or may be bonded to the substrate 102 by the adhesive properties of or the adhesive on the shell 12 of the microcapsules 10 and/or the microcapsule immobilizing agent on the substrate 102.

In embodiments, the color density formed or defined by the display layer 106 may not be continuous, uninterrupted or consistent along the substrate, the photoreceptor may transfer additional charged particles of microcapsules 10 onto the substrate 102 as shown at step 214 in FIG. 10. In embodiments, the display layer 106 that may remain on the substrate 102 may be continuous, uninterrupted and/or consistent. The photoreceptor may transfer any amount of additional charged particles of microcapsules 10 onto the substrate 102 until the display layer 106 on the substrate 102 may be continuous, uninterrupted and/or consistent across the substrate 102. Thus, the display layer 106 may be multiple display layers of microcapsules 10 on the substrate 102.

The color density formed by or defined by the display layer 106 that may remain on the substrate 102 may have a resolution of about seventy-five (75) dots per square inch (dpi) or more. The resolution of the display layer 106 on the substrate 102 may depend on, may be based on or may be associated with a size of the carrier particles and/or a diameter of the microcapsules 10. For example, as the size of the carrier particles particles or the diameter of the microcapsules 10 may decrease, the resolution of the display layer 106 may increase on the substrate 102.

One or more gaps may form or may be present between two or more microcapsules 10 as printed on, transferred on or developed on the substrate 102. In embodiments, the microcapsules 10 may be softened or treated prior to or during formation of the display layer 106 as shown at step 216 in FIG. 9. A heating process may apply heat, in a temperature range from about 40° C. to about 210° C., specifically from about 50° C. to about 200° C., to soften and treat the microcapsules 10. Examples of suitable temperature ranges for softening and treating the microcapsules 10 may be illustrated in U.S. Patent Application Publication US2003/0137717, the disclosure of which is totally incorporated herein by reference.

As a result, the shell 12 of the microcapsules 10 may have an increased flexibility or softness. By softening the microcapsules 10, the microcapsules 10 may be positioned in a smaller proximity to each other as the charged particles of microcapsules 10 are transferred to the substrate 102. As a result, less gaps may be formed between two or more microcapsules 10 prior to or during formation of the display layer 106 which may increase consistency or uniformity in the resolution of the display layer 106 across the substrate 102.

In embodiments, as shown at step 218 in FIG. 9, the microcapsules 10 may be pressed against the substrate 102 or pressure may be applied to the microcapsules from an exterior force, such as, a roller, a press or the like. By applying pressure or pressing the microcapsules 10, the microcapsules 10 forming the display layer 106 may be positioned in a smaller proximity to each other. Thus, less gaps may be formed between two or more microcapsules prior to or during formation of the display layer 106 which may also increase consistency or uniformity in the resolution of the display layer 106 across the substrate 102. The amount of pressure applied to the microcapsules 10 from the exterior force may be in a range from about 2 psi to about 20 psi, specifically from about 5 psi to about 15 psi.

Figure 5:
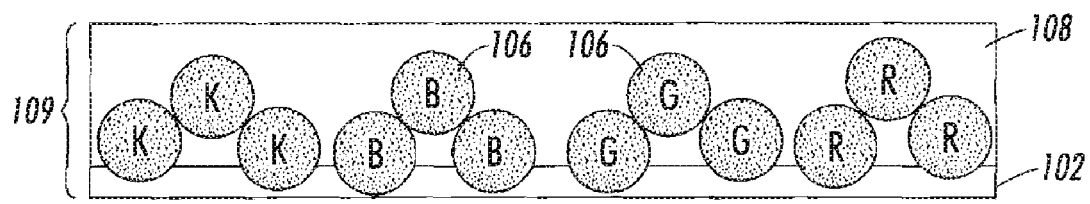

A protective layer 108 may be applied to or dispersed upon the substrate 102 and/or the display layer 106 as shown at step 220 in FIG. 9. As a result, the substrate 102, the display layer 106 and the protective layer 108 may form or may define a combined structure 109 as illustrated in FIG. 5.

Figure 6:
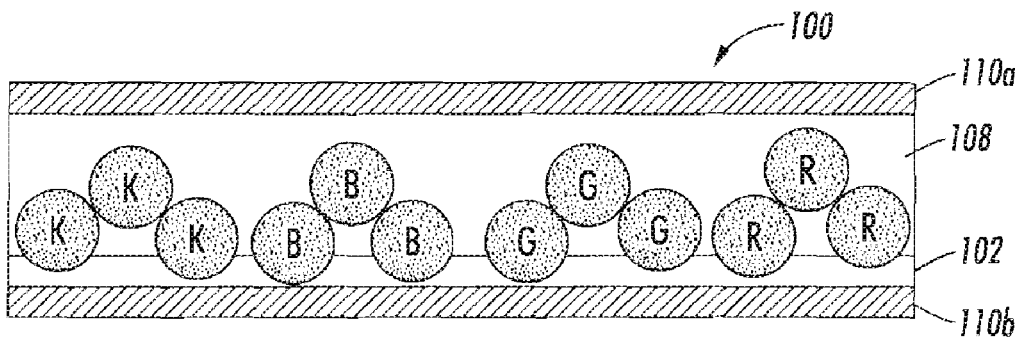

A first or a front conductive substrate 110a and/or a second or rear conductive substrate 110b (hereinafter "conductive substrates 110a, 110b") may be applied to the combined structure 109 as shown at step 222 in FIG. 9. The combined structure 109 may be located, sandwiched or positioned between the conductive substrates 110a, 110b as illustrated in FIG. 6. In embodiments, the protective layer 108 may be adjacent to the front conductive substrate 110a, and the subtract 102 may be adjacent to the rear conductive substrate 110b. The display device 100 may be defined by or may be formed by the combine structure 109 and the conductive substrates 110a, 110b. Formation of the display device 100 by the combined structure 110 and the conductive substrates 110a, 110b may have a manufacturing cost that may be lower than a manufacturing cost associated with a conventional display.

The conductive substrates 110a, 110b may either be flexible or rigid. The top side 18 of the shell 12 for the microcapsules 10 of the display layer 106 may be located adjacent to the front conductive substrates 110a as shown in FIGS. 1 and 2. As a result, the sets of particles 14, 16 which may be located or positioned adjacent to the top side 18 of the shell 12 for the microcapsules 10 in the display layer 106 may be visible through the front conductive substrate 110a.

The conductive substrates 110a, 110b that sandwich the display layer 106 of the microcapsules 10 therebetween may have a length and width corresponding to the overall length and width of the substrate 102 or the display layer 106. The conductive substrates 110a, 110b thus may be continuous, unitary films that are not present as just separated pieces over the display layer 106 of the display device, although a plurality of segregated substrates may also be used. The conductive substrates 110a, 110b may be made to be as thin as possible while still maintaining appropriate conductive properties and structural integrity. For example, the conductive substrates 110a, 110b may have a height, or thickness, of from about 10 microns to about 500 microns, such as from about 10 to about 250 microns or from about 20 to about 100 microns.

The display device 100 may have any suitable overall length and width as desired. The display device 100 may also be made to have any desired height, although a total height of from about 30 to about 1,000 microns, such as from about 30 to about 400 microns or from about 50 to about 300 microns, may be used in terms of size and ease of use of the display device 100.

In embodiments, the rear conductive substrate 110b may apply the electric field to one or more microcapsules of the display layer 106, for example by transmitting the field as applied by selective electrodes associated with the substrate as discussed above. The electric field may switch or move the sets of particles within the microcapsules 10 of the display layer 106 to display desired particles as described above. The electric field may move a desired or an intended set of particles so as to be displayed by the microcapsules 10 via the front substrate 110a. The microcapsules 10 of the display layer 106 which may define or form one or more subpixels for each pixel of the display layer 106 on the substrate 102 may be controlled by the electric field to display the desired particles. By controlling the particles displayed by the subpixels for each pixel of the display layer, the pixels may be controlled by the electric field to form the image via the display layer 106 of the display 100.

In embodiments, a field-effect transistor (not shown in the figures) may be attached to or may be connected to the conductive substrates 110a, 110b to control a conductivity of the conductive substrates 110a, 110b or to provide voltage-controlled resistors for the conductive substrates 110a, 110b. In embodiments, a thin film transistor (not shown in the figures) may be attached to or may be connected to the rear conductive substrate 110b to provide a field-effect transistor for the rear conductive substrate 110b. The field-effect transistor or the thin film transistor may be applied to the rear conductive substrate 110b to apply the electric field to microcapsules 10 of the display layer 106.

The image may be formed by applying the electric field to the microcapsules 10 that define one or more pixels or one or more subpixels for displaying desired particles thereby. The rear conductive substrate 110b may apply or may not apply the electric field to each microcapsule 10 defining each pixel or each subpixel for the display device 100. By applying or not applying the electric field or applying a reversal of the electric field to each microcapsule 10 defining each pixel or each subpixel, the rear conductive substrate 110b may control positions for each of the sets of particles 14, 16 in the microcapsules 10 as illustrated in FIGS. 1 and 2. As a result, the rear conductive substrate 110b may control the microcapsules 10 of the display layer 106 to form an image on the display device 100.

Figure 7:
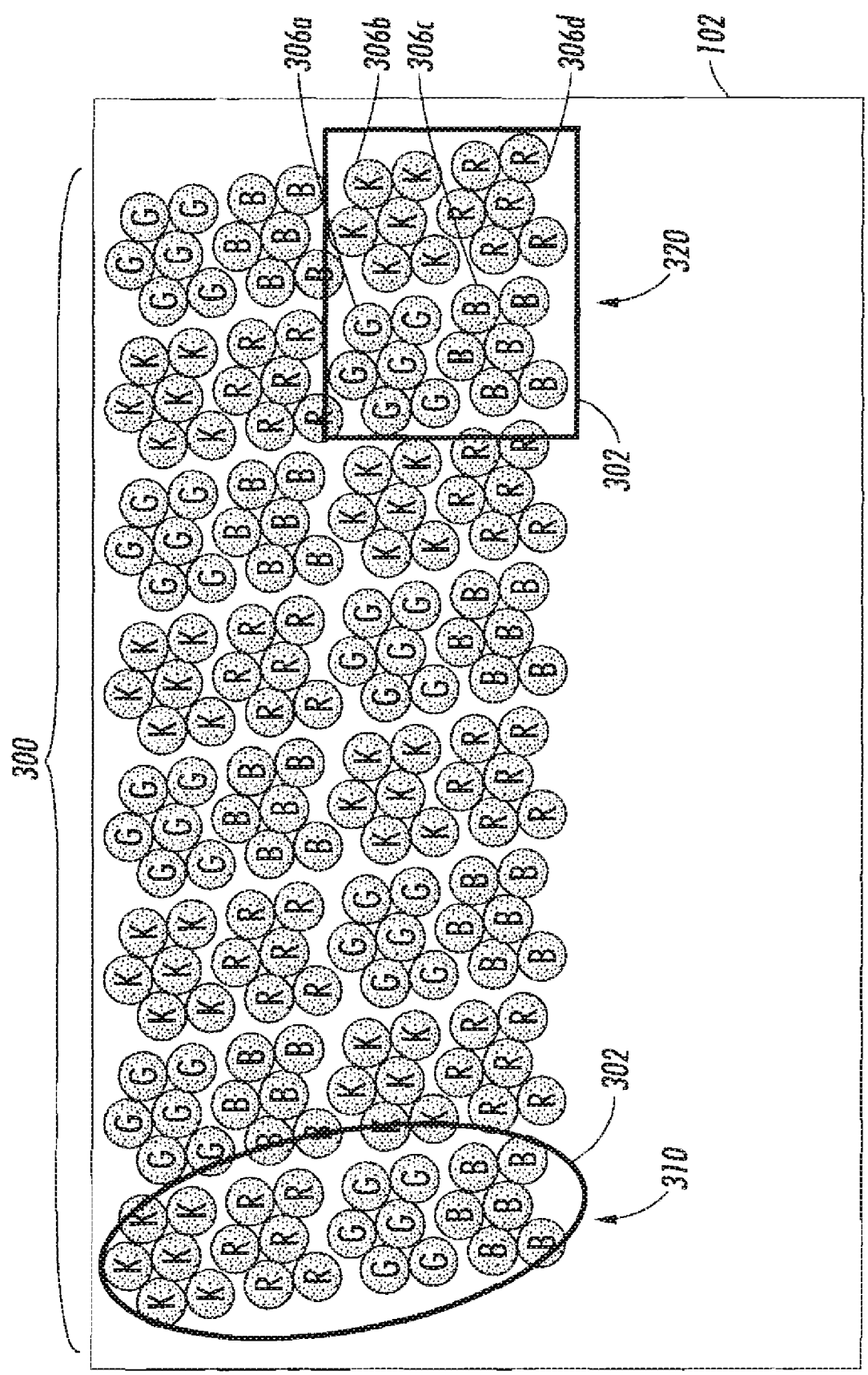
FIGS. 7 and 8 are top planar views of a layout having microcapsules on a substrate in an embodiment of the present disclosure.
Figure 8:
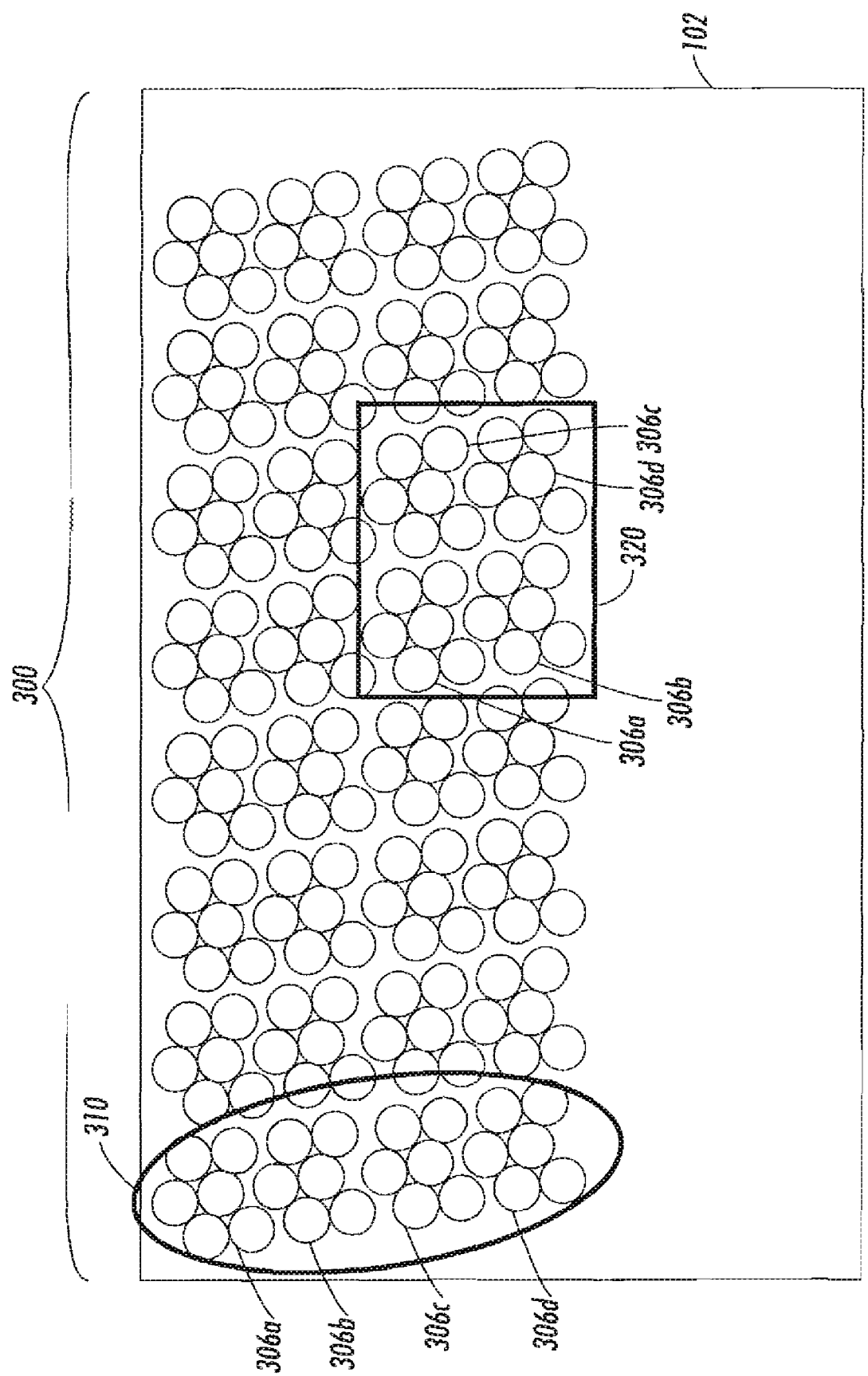

FIGS. 7 and 8 illustrate that the substrate 102 may have a layout 300 including the display layer 106 positioned thereon. The layout 300 may include a multiplicity of microcapsules 10 in the display layer 106 that are positioned or located adjacent to each other defining a pixel 302 of the display layer 106. The layout 300 and/or the display layer 106 may contain any number of pixels 302 that may be required to achieve a desired resolution for the display layer 106 of the display 100. Each of the microcapsules 10 forming the pixel 302 of the display layer 106 may define a subpixel of the pixel 302.

Each pixel 302 on the substrate 102 may be orientated in a first configuration 310 or a second configuration 320 as shown in FIGS. 7 and 8. The first configuration 310 of the pixel 302 may include four (4) microcapsules, such as microcapsules 306a-306d that may extend vertically or horizontally across the substrate 102. The second configuration 320 of the pixel 302 may include the microcapsules 306a-306d that may be formed in a box-shape or a square-shape. In embodiments, each of the microcapsules 306a-306d defining each pixel 302 may be a microcapsule having differently colored particles. For example, each pixel 302 may include the microcapsule 306a that may contain a set of red particles, the microcapsule 306b that may contain a set of green particles, the microcapsule 306c that may contain a set of blue particles, and the microcapsule 306d that may contain a set of black particles. Along with the colored particles, each of the microcapsules 306a-306d of the layout 300 on the substrate 102 may contain a set of white particles.

In embodiments, each of the microcapsules 306a-306d for each pixel 302 may contain a first set of colored particles and a second set of differently colored particles. For example, the microcapsule 306a may contain a set of red particles and a set of green particles, the microcapsule 306b may contain a set of red particles and a set of blue particles, the microcapsule 306c may contain a set of blue particles and a set of green particles and the microcapsule 306d may contain a set of white particles and a set of black particles. In embodiments, each pixel 302 may be defined by three (3) microcapsules, such as the microcapsules 306a-306c. For example, the microcapsule 306a may contain a set of cyan particles, the microcapsule 306b may contain a set of yellow particles, and the microcapsule 306c may contain a set of magenta particles.

As described above, the rear conductive substrate 110b may apply the electric field to the microcapsules 10 defining each subpixel for each pixel 302, or to each of the capsules 306a-306d of each pixel 302. The set of colored particles and/or the set of white particles may switch or may move position within the each of the microcapsules 306a-306d for each pixel 302 depending the electric field and/or the conductivity charge associated with each particle set. As a result, each microcapsule of or each subpixel of each pixel 302 may display the colored particles or the white particles via the microcapsules 306a-306d and may be in the color mode or a combination of the color mode and the white mode.

Thus, each pixel 302 or each subpixel of each pixel 302 may display a color, such as, blue, green, red, black, white, cyan, yellow, magenta, white or a combined color thereon based on the particle set nearest to the front conductive substrate 110a. As a result, each pixel 302 may display an intended color through the front conductive substrate 110*a* via the subpixels of each pixel 302 on the substrate 102 as shown in FIG. 8. As a result, the layout 300 may display a full colored image and/or a black and white image.

In embodiments, the electric-field may change as applied to certain ones of the microcapsules that define each subpixel for each pixel 302 of the layout 300. The particle sets displayed by the selective microcapsules that define one or more of the subpixels thus may switch or move positions based on the change in electric field. In embodiments, microcapsules 306*a*-306*d* for each pixel 302 may display the set of white particles that may be visible through the first electrode layer 110*a* based on the electric field and/or the conductivity charge associated with the particle sets. As a result, the layout 300 on the substrate 102 may display no image or be in white mode as shown in FIG. 8.

In embodiments, the substrate 102 may display a half-toning effect via the microcapsules 306*a*-306*d* defining subpixels of each pixel 302. The half-toning effect may be achieved by applying, not applying or reversely applying the electric field to less than all of the microcapsules 306*a*-306*d* for one or more pixels 302 of the layout 300. As a result, a first portion of the microcapsules 306*a*-306*d* for one or more pixels 302 may display colored particles, and the second portion of the microcapsules 306*a*-306*d* for one or more pixels 302 may display white particles based on the electric field and/or the conductivity charge associated with the particle sets. Thus, the half-toning effect may be defined by or formed by one or more pixels 302 that have the first portion of the microcapsules 306*a*-306*d* displaying the sets of the colored particles and the second portion of the microcapsules 306*a*-306*d* displaying the white particles.

The microcapsules 306*a*-306*d* or subpixels for each pixel 302 may have a microcapsule size within a range of about 10 microns to about 150 microns, more preferably in a range of about 20 microns to about 120 microns. In embodiments, the layout 300 on the substrate 102 may have a resolution of about seventy-five (75) dpi, and each pixel 302 of the layout 300 may have a pixel size in a range of about 300 microns to about 360 microns. With a resolution of about seventy-five (75) dpi, the layout 300 on the substrate 102 may have a resolution which may be similar to or substantially similar to a resolution of a computer screen or a monitor.

The rear conductive substrate 110*b* may apply the electric field to any number of the microcapsules 306*a*-306*d* for each pixel 302 of the layout 300. As a result, the layout 300 may display an image at high resolution by displaying colored particles for any number of the microcapsules 306*a*-306*d* of any number of the pixels 302. In embodiments, the image may be displayed by all of the subpixels of each pixel 302 or by all of the pixels 302 by the layout 300.

In embodiments, the orientation or the location of each of the microcapsules 306*a*-306*d* allows for developing or for displaying the full colored image at high resolution via the subpixels of the pixels 302. To display the full colored image at high resolution, the microcapsules 306*a*-306*d* for each pixel 302 may be required to be orientated in a sequence to display the sets of colored particles within the full colored image at the high resolution. For example, the microcapsules 306*a*-306*d* for each pixel 302, in the first configuration 310, may be required to be in a sequence from the microcapsule 306*a* at an upper location to the microcapsule 306*d* at a lower location, with the microcapsules 306*b*, 306*c* therebetween as shown in FIGS. 7 and 8. In a second configuration 320 for the pixel 302, the microcapsule 306*a* may be located in an upper left position, the microcapsule 306*b* may be located in an upper right position, the microcapsule 306*c* may be located in a lower left position, and the microcapsule 306*d* may be located in a lower right position. As a result, each microcapsule 306*a*-306*d* or subpixel for each pixel 302 may display a specific set of non-white color particles to form or to define the image on the layer 300 at high resolution.

The photoreceptor may transfer or may develop the microcapsule developer onto the substrate 102 to form pixels 302 in the first configuration 310 or the second configuration 320. The photoreceptor may place each of the microcapsules 306*a*-306*d* at the proper orientation to achieve the first configuration 310 or the second configuration 320. Moreover, the photoreceptor may be capable of positioning the microcapsules 306*a*-306*b* at any desired orientation to form any configuration as known to one skilled in the art.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for forming a multi-color electrophoretic display, the method comprising:
    providing microcapsules, wherein the microcapsules comprise:
        a shell that is transparent; and
        a display medium within the shell, wherein the display medium is comprised of either (a) at least two sets of differently colored particles in a substantially clear fluid, or (b) at least one set of colored particles in a differently colored fluid;
    transferring the microcapsules to a substrate, wherein the microcapsules on the substrate define a display layer of microcapsules on the substrate; and
    after the transferring, positioning a conductive substrate on to the substrate, wherein the substrate is located between the display layer and the conductive substrate, wherein the conductive substrate applies an electric field to the display layer, wherein the sets of particles of each microcapsule in the display layer are movable within the microcapsule by the electric field.

2. The method according to claim 1, wherein transferring the microcapsules comprises transferring the microcapsules to a photoreceptor, then transferring the microcapsules from the photoreceptor to the substrate.

3. The method according to claim 1, further comprising:
    drying the microcapsules to form a dry powder of microcapsules that is movable to the substrate.

4. The method according to claim 1, wherein transferring the microcapsules comprises moving the microcapsules onto the substrate by a xerographical printing process, liquid xerography, ballistic aerosol marking or ion-charging development.

5. The method according to claim 1, further comprising:
    forming a protective layer on the display layer wherein the display layer is located between the protective layer and the substrate.

6. The method according to claim 1, further comprising:
    electrostatically charging the microcapsules to form charged particles that are movable to the substrate.

7. The method according to claim 1, further comprising:
    mixing carrier particles with the microcapsules to form a developer that is movable to the substrate.

8. A method for forming a multi-color electrophoretic display, the method comprising:

providing microcapsules, wherein the microcapsules have an electrostatic charge, and wherein the microcapsules comprise:
a shell that is transparent; and
a display medium within the shell, wherein the display medium is comprised of either (a) at least two sets of differently colored particles in a substantially clear fluid, or (b) at least one set of colored particles in a differently colored fluid;

transferring the microcapsules to a substrate, wherein the electrostatic charge of the microcapsules attracts the microcapsules to the substrate, wherein a display layer of microcapsules is formed on the substrate; and after the transferring, positioning a conductive substrate on to the substrate, wherein the substrate is located between the display layer and the conductive substrate, wherein the conductive substrate applies an electric field to the display layer, and wherein the sets of particles of each microcapsule in the display layer are movable within the microcapsule by the electric field.

9. The method according to claim 8, wherein the providing comprises mixing carrier particles with the microcapsules to form a developer from which the microcapsules are transferred.

10. The method according to claim 8, wherein providing the microcapsules comprises charging the microcapsules with ions.

11. The method according to claim 8, wherein at least one of the microcapsules have a surface charging control agent or a flow aid agent.

12. The method according to claim 8, further comprising:
softening the microcapsules of the display layer after being transferred to the substrate, wherein gaps between the microcapsules or the microcapsules and the substrate are reduced.

13. The method according to claim 8, wherein transferring the microcapsules comprises applying the microcapsules to the substrate by ballistic aerosol marking.

14. The method according to claim 8, further comprising:
applying pressure to the microcapsules of the display layer after being transferred to the substrate, wherein gaps between the microcapsules or the microcapsules and the substrate are reduced.

15. The method according to claim 8, wherein providing the microcapsules comprises suspending the charged microcapsules in a dielectric fluid prior to transferring the charged microcapsules to the substrate and wherein transferring the microcapsules comprises contacting the fluid with the substrate.

16. The method according to claim 8, wherein a photoreceptor, positioned adjacent to the substrate, receives the microcapsules and moves the microcapsules to the substrate.

17. The method according to claim 8, wherein providing the microcapsules comprises contacting the microcapsules with a charged roll device prior to transferring the microcapsules to the substrate.

18. The method according to claim 8, wherein the microcapsules are transferred to the substrate such that each microcapsule of the display layer defines a subpixel of a pixel of the display.

19. The method according to claim 18, wherein each pixel includes at least three different two particle set microcapsules, including either red/white, blue/white and green/white microcapsule combinations or red/green, blue/green and red/blue microcapsule combinations.

20. The method according to claim 8, wherein the fluid of the display medium is a dielectric liquid.

21. The method according to claim 20, wherein a density of the particles within the microcapsules is less than 20% greater than or less than 20% less than the density of the display media of the microcapsules.

22. A method for forming a multi-color electrophoretic display, the method comprising:
electrostatically charging microcapsules to form charged particles, wherein each microcapsule comprises:
a shell that is transparent, wherein a surface of the shell contains a charge control agent or a flow aid agent;
a display medium within the shell, wherein the display medium is comprised of either (a) at least two sets of differently colored particles in a substantially clear fluid, or (b) at least one set of colored particles in a differently colored fluid;

transferring the charged particles of microcapsules to a substrate, wherein the microcapsules on the substrate define a display layer of microcapsules on the substrate; and after the transferring, positioning a conductive substrate on to the substrate, wherein the substrate is located between the display layer and the conductive substrate, wherein the conductive substrate applies an electric field to the display layer, and wherein the sets of particles of each microcapsule in the display layer are movable within the microcapsule by the electric field.

23. The method according to claim 22, further comprising:
adding carrier particles to the microcapsules to form a developer that is movable to the substrate, wherein an electrostatic charge is associated with the carrier particles.

24. The method according to claim 22, further comprising:
forming a protective layer to the display layer, wherein the display layer is located between the protective layer and the substrate.

25. The method according to claim 22, wherein each microcapsule of the display layer defines a subpixel of a pixel for an image, wherein the subpixel for each pixel displays white or a color.

26. The method according to claim 22, further comprising:
softening the microcapsules of the display layer after being transferred to the substrate, wherein gaps between the microcapsules or the microcapsules and the substrate are reduced.

27. The method according to claim 22, wherein transferring the charged particles comprises moving the charged particles to the substrate by a xerographical printing process, liquid xerography, ion-charging development or ballistic aerosol marking.

* * * * *